United States Patent
Ma

(10) Patent No.: US 8,774,413 B2
(45) Date of Patent: Jul. 8, 2014

(54) METHOD AND APPARATUS FOR PROCESSING ENTITLEMENT CONTROL MESSAGE PACKETS

(75) Inventor: Hongqiang Ma, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/579,785

(22) PCT Filed: Dec. 3, 2010

(86) PCT No.: PCT/CN2010/079431
§ 371 (c)(1),
(2), (4) Date: Aug. 17, 2012

(87) PCT Pub. No.: WO2012/003693
PCT Pub. Date: Jan. 12, 2012

(65) Prior Publication Data
US 2012/0308010 A1  Dec. 6, 2012

(30) Foreign Application Priority Data
Jul. 6, 2010  (CN) .......................... 2010 1 0219900

(51) Int. Cl.
*H04L 9/00* (2006.01)
*H04L 29/06* (2006.01)

(52) U.S. Cl.
CPC ................ *H04L 63/08* (2013.01); *H04L 63/06* (2013.01)
USPC ........... 380/277; 380/239; 380/241; 380/260; 713/171; 726/1; 370/230

(58) Field of Classification Search
CPC .............. H04L 9/08; H04L 63/08; H04L 9/06
USPC .................. 380/277, 239, 241, 260; 713/171; 726/1–36
See application file for complete search history.

(56) References Cited

U.S. PATENT DOCUMENTS

| 4,937,866 | A | * | 6/1990 | Crowther et al. | ............. | 380/241 |
| 7,411,902 | B2 | * | 8/2008 | Kumar et al. | ................. | 370/230 |

(Continued)

FOREIGN PATENT DOCUMENTS

| CN | 101291419 A | 10/2008 |
| CN | 101309120 A | 11/2008 |

(Continued)

OTHER PUBLICATIONS

Monitoring Conditional Access Syatem, 2009, Bridget Technologies Co AS, pp. 1-13.*

(Continued)

*Primary Examiner* — Luu Pham
*Assistant Examiner* — Fahimeh Mohammadi
(74) *Attorney, Agent, or Firm* — Ling Wu; Stephen Yang; Ling and Yang Intellectual Property LLC

(57) ABSTRACT

A method for processing Entitlement Control Message (ECM) packets is disclosed in the present invention. The method includes: a terminal receiving a broadcast code stream multiplexing frame and obtaining ECM packets from the received broadcast code stream multiplexing frame; and analyzing the ECM packet if the indicator of the ECM packet is judged to be inconsistent with the indicator of the locally stored ECM packet. An apparatus for processing ECM packets is also disclosed in the present invention, and the apparatus includes: a receiving module, an obtaining module, a judging module and an analyzing module. With the present invention, the efficiency of the terminal processing ECM packets is improved, and the limited resources of the terminal can be saved.

7 Claims, 3 Drawing Sheets

(56) References Cited

U.S. PATENT DOCUMENTS

| | | | |
|---|---|---|---|
| 7,590,243 B2* | 9/2009 | Kahn et al. | 380/239 |
| 8,270,608 B2* | 9/2012 | Reeds et al. | 380/260 |
| 2001/0012366 A1* | 8/2001 | Van Rijnsoever et al. | 380/241 |
| 2004/0151315 A1* | 8/2004 | Kim | 380/241 |
| 2007/0242829 A1* | 10/2007 | Pedlow | 380/277 |
| 2008/0209300 A1* | 8/2008 | Fukushima et al. | 714/748 |
| 2008/0271093 A1* | 10/2008 | Nabeshima et al. | 725/70 |

FOREIGN PATENT DOCUMENTS

| | | | |
|---|---|---|---|
| CN | 101583012 A | 11/2009 | |
| JP | 2001016513 A | 1/2001 | |
| JP | 2005203837 A | 7/2005 | |
| WO | 2006114123 A1 | 11/2006 | |

OTHER PUBLICATIONS

Tong Ho, Digital Video Broadcasting Conditional Access Architecture, Fall 2002, San Jose State University, pp. 1-7.*

Avishai Wool, Key Management for Encrypted Broadcast, May 2000, ACM, vol. 3, pp. 107-134.*

Jianbo Liu; Cheng Yang; Jiayin Tian, A Novel Conditional Access Architecture for TV Service Protection, Dec. 2007, IEEE, pp. 608-611.*

International Search Report for PCT/CN2010/079431 dated Mar. 23, 2011.

* cited by examiner

METHOD AND APPARATUS FOR PROCESSING ENTITLEMENT CONTROL MESSAGE PACKETS

TECHNICAL FIELD

The present invention relates to the field of mobile multimedia broadcasting and provides a method and apparatus for a multimedia terminal processing ECM packets.

BACKGROUND OF THE RELATED ART

Mobile Broadcast Business Management System (MBBMS) is a business management and protection system based on broadcast mobile multimedia which is developed by the China Mobile, and it can use a one-way broadcast network to provide downlink transmission of multimedia content, and it makes use of the authentication management system and the two-way network transmission capacity of the mobile communication network to complete the user authentication, authorization and management; meanwhile, the two-way channel of the mobile communication network is utilized to provide value-added services, such as the interaction and so on, for the mobile users. With the combination of the China Mobile Multimedia Broadcasting (CMMB) and the MBBMS being in operation, the functionality and performance of the terminal processing the code stream in the existing network environment as well as the user experience attract more and more attention.

For the scrambled programs, the terminal must rely on the Entitlement Control Message (ECM) packets in the broadcast code stream to acquire the encrypted key, and the encrypted key is used to obtain the final program stream key via the User Authentication Module (UAM) or the Security Digital (SD) card, thus the scrambled audio and video data can be further descrambled to acquire the raw stream, which is then played to the users for watching, and therefore, the terminal processing the ECM packets is crucial. In the prior art, each ECM packet is analyzed, and each ECM packet generally has two keys (MTKs) for descrambling the audio and video data (one MTK is the current MTK, and the other is the MTK in the next cycle), and the two MTKs in each ECM packet need to be analyzed, which seriously affects the performance of the terminal. Moreover, in the real network, because of the front-end server or the network, there might be error packets in the ECM packets transmitted in the broadcast code stream, and the terminal further acquires the MTK for descrambling and playing according to the ECM packets. If an ECM packet has error, the terminal cannot acquire the key, thus the playing fails, and at this time, the terminal needs to carry out processing reasonably in order to provide the users with a better experience.

SUMMARY OF THE INVENTION

The technical problem to be solved in the present invention is to provide a method and terminal for processing entitlement control message (ECM) packets in order to save resources of the terminal.

In order to solve the aforementioned technical problem, the present invention provides a method for processing entitlement control message (ECM) packets, the method comprising:

a terminal receiving a broadcast code stream multiplexing frame, and acquiring an ECM packet from the received broadcast code stream multiplexing frame; and if an indicator of the ECM packet is judged to be inconsistent with an indicator of a locally stored ECM packet, analyzing the ECM packet.

The step of analyzing the ECM packet comprises:

obtaining a data packet encapsulated with a key for descrambling audio and video data from the ECM packet; and if a key indicator corresponding to the data packet is judged to be inconsistent with a locally stored key indicator, obtaining the key for descrambling the audio and video data in the data packet.

After the key indicator corresponding to the data packet is judged to be inconsistent with the locally stored key indicator, said method further comprises:

judging whether the data packet is an error packet or not, if it is a non-error packet, obtaining the key for descrambling the audio and video data in the data packet; if it is an error packet and a current key for descrambling the audio and video data is judged to be valid, continuing to receive a next ECM packet.

The step of judging whether the data packet is an error packet or not comprises:

if data sections indicating version information and data type information of the data packet are examined to be both predetermined values, and a data section storing the key for descrambling the audio and video data is examined not to be 0, the data packet is judged as a non-error packet;

if the data sections indicating the version information and data type information of the data packet are examined not to be predetermined values, or the data section storing the key for descrambling the audio and video data is examined to be 0, the data packet is judged as an error packet.

After the step of judging the data packet as a non-error packet, the method further comprises:

updating the locally stored key indicator as the key indicator corresponding to the data packet.

In order to solve the aforementioned technical problem, the present invention also provides an apparatus for processing Entitlement Control Message (ECM) packets, and the apparatus comprises:

a receiving module, which is configured to: receive a broadcast code stream multiplexing frame, and send the broadcast code stream multiplexing frame to an obtaining module;

the obtaining module, which is configured to: obtain an ECM packet from the received broadcast code stream multiplexing frame, and send an indicator of the ECM packet to a judging module;

the judging module, which is configured to: after receiving the indicator of the ECM packet, if the indicator of the ECM packet is judged to be inconsistent with an indicator of a locally stored ECM packet, trigger an analyzing module; and the analyzing module, which is configured to: analyze the ECM packet.

The analyzing module comprises:

an obtaining unit, which is configured to: obtain a data packet encapsulated with a key for descrambling audio and video data from the ECM packet, and send a key indicator corresponding to the data packet to a judging unit;

the judging unit, which is configured to: after receiving the key indicator corresponding to the data packet, if the key indicator corresponding to the data packet is judged to be inconsistent with a locally stored key indicator, trigger a key analyzing unit; and the key analyzing unit, which is connected with the obtaining unit and the judging unit, and the key analyzing unit is configured to: analyze out the key for descrambling the audio and video data from the data packet.

The judging unit is also configured to: after judging that the key indicator corresponding to the data packet is inconsistent with the locally stored key indicator, judge whether the data packet is an error packet or not, if it is a non-error packet, trigger the key analyzing unit; if it is an error packet and a current key for descrambling the audio and video data is judged to be valid, trigger the receiving module to receive the broadcast code stream multiplexing frame.

The judging unit is configured to judge whether the data packet is an error packet or not in a following way:

if data sections indicating version information and data type information of the data packet are examined to be both first predetermined values and a data section storing the key for descrambling the audio and video data is examined not to be a second predetermined value, judging the data packet to be a non-error packet;

if the data sections indicating the version information or data type information of the data packet are examined not to be the first predetermined values or the data section storing the key for descrambling the audio and video data is examined to be the second predetermined value, judging the data packet to be an error packet.

The analyzing module further comprises an updating unit that is connected with the judging unit, the judging unit is further configured to: after judging that the key indicator corresponding to the data packet is inconsistent with the locally stored key indicator, trigger the updating unit;

the updating unit is configured to: update the locally stored key indicator to be the key indicator corresponding to the data packet.

In summary, the method and apparatus for processing the ECM packets provided in the present invention improve the efficiency of the terminal processing the ECM packets and save the limited resources of the terminal.

PREFERRED EMBODIMENTS OF THE PRESENT INVENTION

In the following, the technical solution of the present invention will be described in further detail in combination with the accompanying drawings and embodiments. It should be noted that without conflict, the embodiments in this application and the characteristics of the embodiments could be combined randomly with each other.

Figure 1:
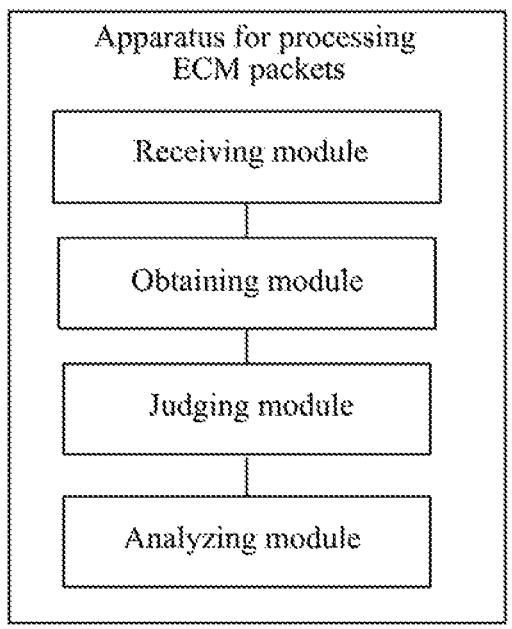
FIG. 1 is a schematic diagram of an apparatus for processing ECM packets in accordance with the present invention.

FIG. 1 is a schematic diagram of the apparatus for processing ECM packets in accordance with the present invention, as shown in FIG. 1, the apparatus of the present invention comprises: a receiving module, an obtaining module, a judging module and an analyzing module. Wherein, the receiving module is configured to: receive a broadcast code stream multiplexing frame, and send the broadcast code stream multiplexing frame to the obtaining module;

the obtaining module is configured to: obtain an ECM packet from the received broadcast code stream multiplexing frame, and send the indicator of the ECM packet to the judging module;

the judging module is configured to: after receiving the indicator of the ECM packet, if the indicator of the ECM packet is judged to be inconsistent with the indicator of the locally stored ECM packet, trigger the analyzing module;

the analyzing module is configured to: analyze the ECM packet.

Therefore, the apparatus of the present invention only analyzes the ECM packets whose indicator is not consistent with the indicator of the locally stored ECM packet rather than all the ECM packets, which can effectively save the resources of the terminal.

Figure 2:
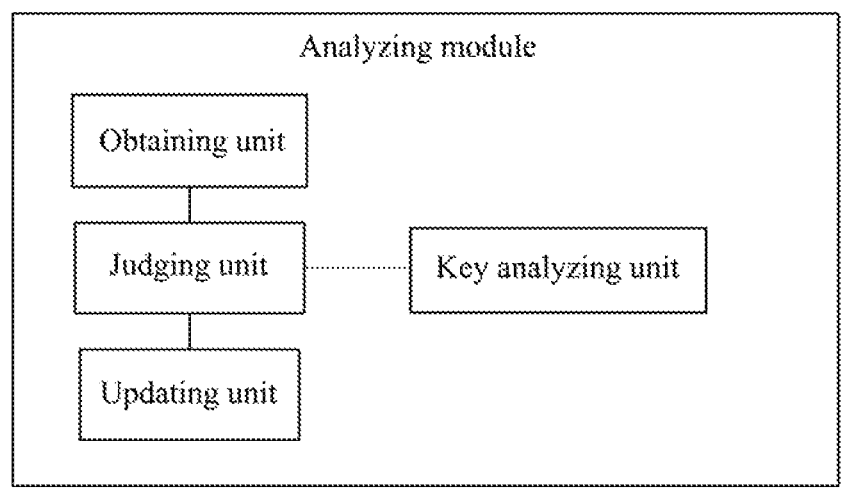
FIG. 2 is a schematic diagram of an analyzing module in the apparatus for processing the ECM packets in accordance with the present invention.

Wherein, the analyzing module can comprise: an obtaining unit, a judging unit and a key analyzing unit, as shown in FIG. 2. Wherein, the obtaining unit is configured to: obtain a data packet encapsulated with a key for descrambling the audio and video data from the ECM packet, and send the key indicator corresponding to the data packet to the judging unit;

the judging unit is configured to: after receiving the key indicator corresponding to the data packet, if the key indicator corresponding to the data packet is judged to be inconsistent with the locally stored key indicator, trigger the key analyzing unit;

the key analyzing unit is connected with the obtaining unit and the judging unit, and the key analyzing unit is configured to: analyze out the key for descrambling the audio and video data from the data packet.

Therefore, the apparatus of the present invention only analyzes the data packets where indicators corresponding to the data packet encapsulated with the key for descrambling the audio and video data are inconsistent with the locally stored key indicators, and there is no need to analyze all the ECM packets whose indicators are not consistent with the indicators of the locally stored ECM packets, which can further save the effective resources of the terminal.

Furthermore, after judging that the key indicator corresponding to the data packet is inconsistent with the locally stored key indicator, the judging unit is also configured to: judge whether the data packet is an error packet or not, if it is a non-error packet, trigger the key analyzing unit to acquire the key for descrambling the audio and video data in the data packet; if it is an error packet, trigger the receiving module to receive the broadcast code stream multiplexing frame.

The judging unit is configured to judge whether a data packet encapsulated with the key for descrambling the audio and video data is an error packet or not as follows: examining whether the data sections indicating the version information and the data type information of the data packet are both predetermined values or not, and examining whether the data section that stores the key for descrambling the audio and video data is a predetermined value or not, for example, it is 0.

If the data sections indicating the version information and the data type information of the data packet are examined to be both the predetermined value, for example, the first two bytes of the data packet are 0x00 and 0x01 respectively, and the data section that stores the key for descrambling the audio and video data is not 0, the data packet encapsulated with the key for descrambling the audio and video data is determined to be a non-error packet, trigger the key analyzing unit;

if the version information and the data type information of the data packet is examined not to be the predetermined value or the data section that stores the key for descrambling the audio and video data is 0, the data packet encapsulated with the key for descrambling the audio and video data is determined to be an error packet, and when the current key for descrambling the audio and video data is examined to be valid, the receiving module is triggered to receive the broadcast code stream multiplexing frame; if the current key for descrambling the audio and video data is examined to be invalid, the playing is stopped and the user is prompted that the there are errors in the code stream information.

Furthermore, the analyzing module further comprises an updating unit that is connected with the judging unit, the judging unit is also configured to: if the key indicator corresponding to said data packet is inconsistent with the locally stored key indicator through comparison, trigger the updating unit;

the updating unit is configured to: update the locally stored key indicator to be the key indicator corresponding to the data packet.

Therefore, when an error packet is received, the apparatus of the present invention does not immediately stop playing, and in the condition that the current key for descrambling the audio and video data is valid, it continues to receive the ECM packets and analyze the ECM packets until the current key for descrambling the audio and video data becomes invalid, thereby improving the stability of playing programs and providing a better experience for users.

The apparatus for processing the ECM packets in the present invention is applicable to all the terminals with the multimedia playing capability.

Figure 3:
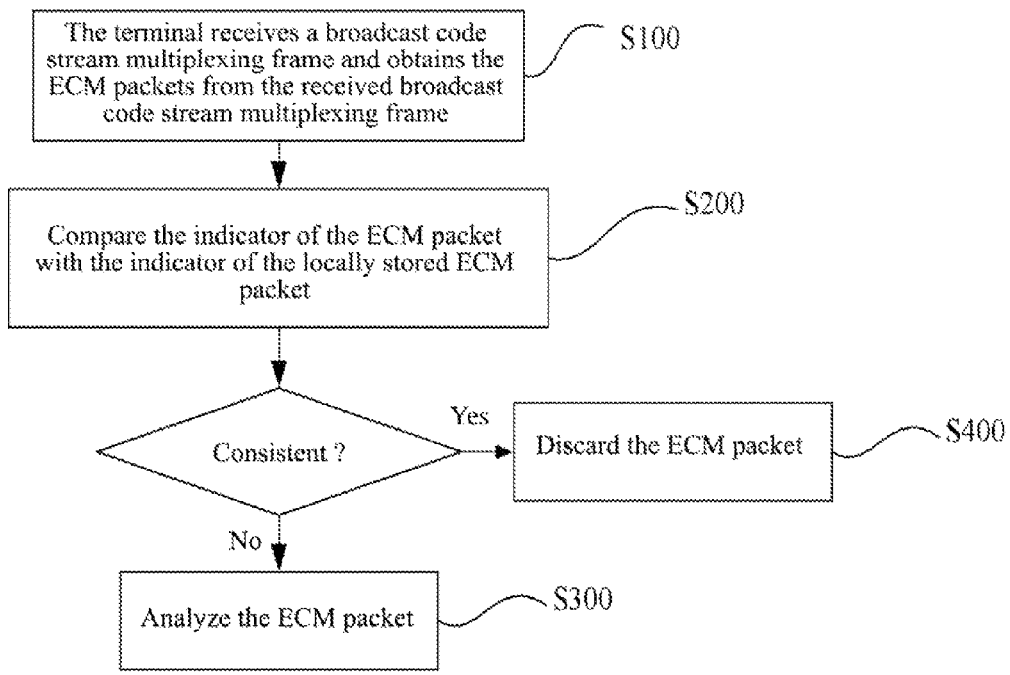
FIG. 3 is a flow chart of a method for processing ECM packets in accordance with the present invention.

FIG. 3 is a flow chart of a method for processing ECM packets in accordance with the present invention, and as shown in FIG. 3, the method of the present invention can comprise the following steps:

S100, the terminal receives a broadcast code stream multiplexing frame and obtains the ECM packets from the received broadcast code stream multiplexing frame;

S200, the indicator of the ECM packet is compared with the indicator of the locally stored ECM packet, if it is inconsistent, proceed to step S300; otherwise, proceed to step S400;

S300, the ECM packet is analyzed.

S400, the ECM packet is discarded.

In this way, the method of the present invention only analyzes the ECM packets whose indicators are inconsistent with the indicator of the locally stored ECM packet rather than all the ECM packets, which can effectively save the resources of the terminal.

Figure 4:
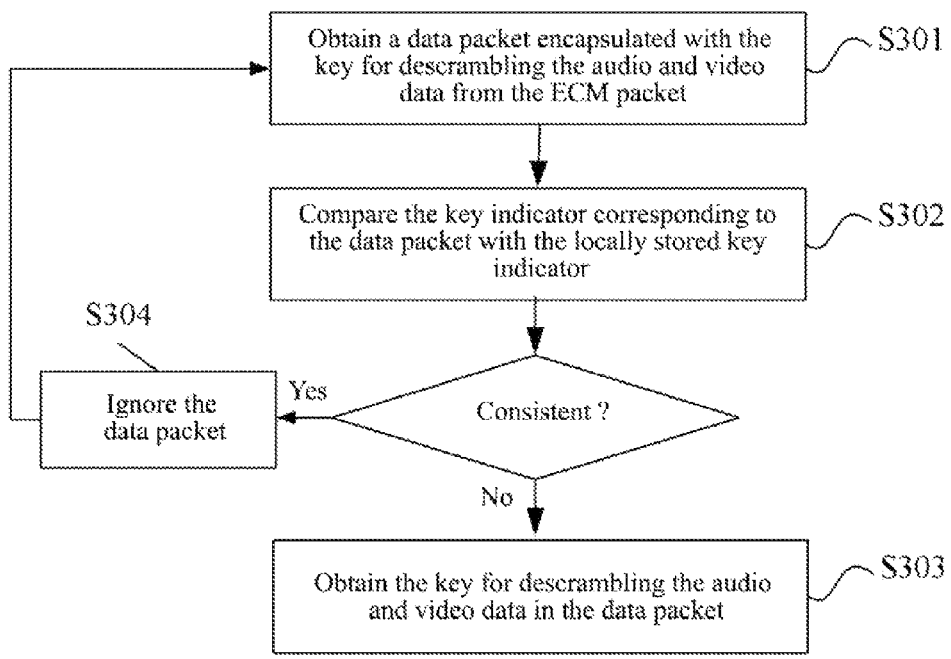
FIG. 4 is a flow chart of analyzing the ECM packets in accordance with the present invention.

Furthermore, the step S300 can comprise the following steps, as shown in FIG. 4:

S301, a data packet encapsulated with the key for descrambling the audio and video data is obtained from the ECM packet;

S302, compare whether the key indicator corresponding to the data packet is consistent with the locally stored key indicator or not, if no, proceed to step S303; otherwise, proceed to step S304;

S303, the key for descrambling the audio and video data in the data packet is obtained.

Specifically, in step S303, it is also further examined whether the data packet encapsulated with the key for descrambling the video and audio data is an error packet or not, and if it is an error packet, it is in the condition that the current key for descrambling the audio and video data is valid, continuing to receive and analyze new ECM packets; if it is a correct packet, the key for descrambling the audio and video data is obtained from the data packet, and the descrambling operation is performed.

Specifically, if the version information or the data type information of the data packet is examined not to be a predetermined value or the data section that stores the key for descrambling the audio and video data is 0, the data packet encapsulated with the key for descrambling the audio and video data is considered to be an error packet.

In this way, the method of the present invention only analyzes the data packets where indicators corresponding to the data packet encapsulated with the key for descrambling the audio and video data are inconsistent with the locally stored key indicators, and there is no need to analyze all the ECM packets that are inconsistent with the indicators of the locally stored ECM packets, thereby further saving the effective resources of the terminal. Moreover, when an error packet is received, the method does not immediately stop playing, but continues to receive and analyze the ECM packets in the condition that the current key for descrambling the audio and video data is valid until the current key for descrambling the audio and video data is invalid, thereby improving the stability of playing programs and providing a better experience for the users.

S304, the data packet is ignored, and the next data packet that is encapsulated with the key for descrambling the audio and video data is analyzed, and proceed to step S301.

Figure 5:
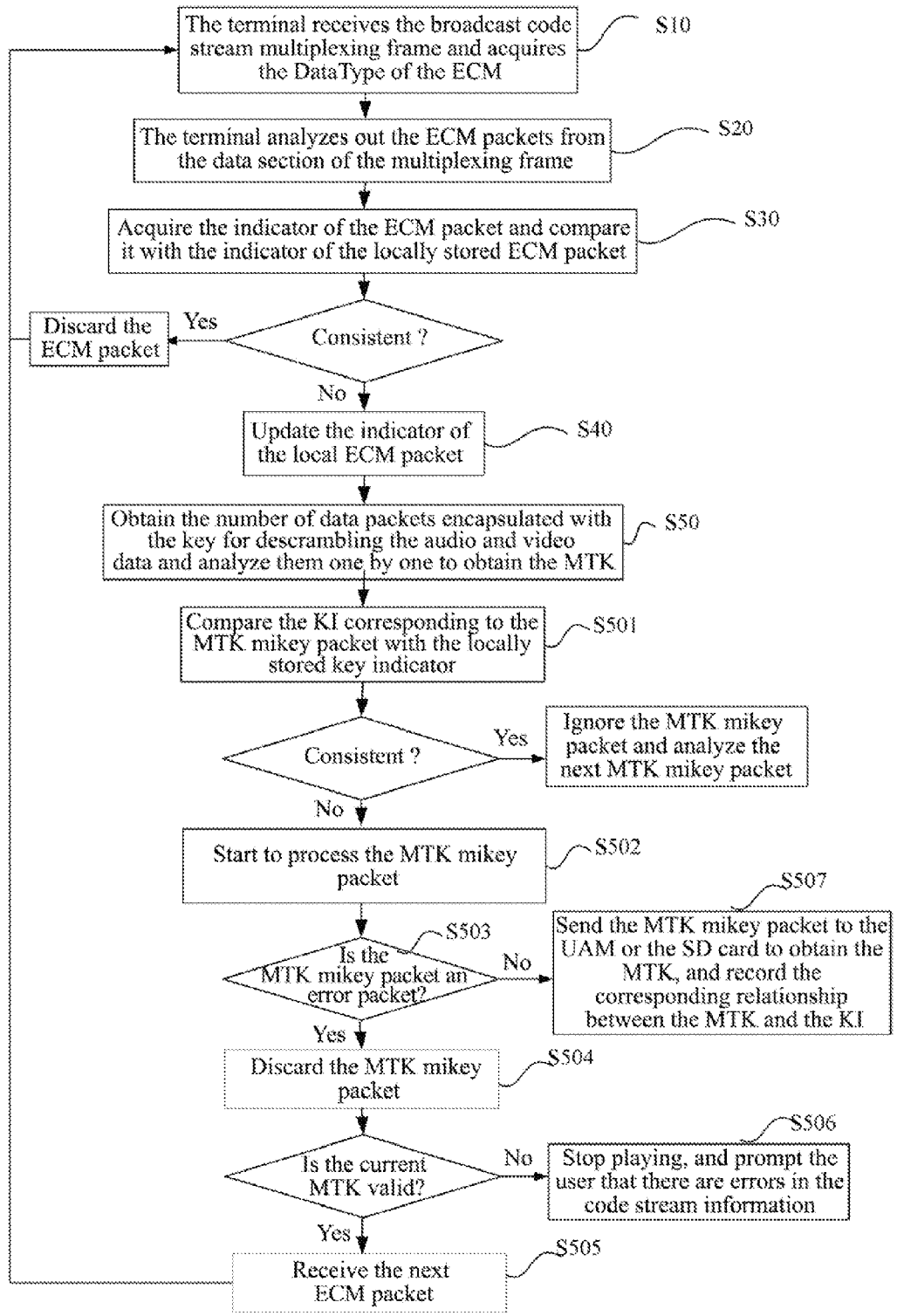
FIG. 5 is a flow chart of a method embodiment for processing ECM packets in accordance with the present invention.

FIG. 5 is a flow chart of a method embodiment for processing ECM packets in accordance with the present invention, and through the following embodiment, the method of the present invention will be described in more detail.

When a terminal is initialized, one variable is defined to store the key indicator (KI), for example, the variable is named local-ki whose initial value is configured to be −1; one variable is defined to store the ECM indicator, for example, the variable is named local_table_id whose initial value is configured to be −1.

S10: the terminal receives the broadcast code stream multiplexing frame, and acquires that the DataType of the ECM is x according to the obtained condition access system indicator (CASID) as well as the encryption and authorization information table in the broadcast code stream TS0;

S20, the terminal analyzes out the data unit whose DataType=x from the data section of the multiplexing subframe, and the data which is obtained through analyzing is the ECM packet;

S30, the terminal analyzes the ECM packet, and the format of the ECM packet is defined in Table 1, and the value of the indicator of ECM packet TableId is acquired to be t, which is compared with the indicator of the locally stored ECM packet local_table_id, and if they are equal, it indicates that they are repeat ECM packets and the ECM packet is discarded, then proceed to step S10, and new ECM packets are received; otherwise, proceed to step S40;

S40, the indicator of the local ECM packet is updated, that is, the value of the local_table_id is set as t;

S50, the number of data packets encapsulated with the key for descrambling the audio and video data (MTK mikey) is obtained, and they are analyzed one by one to obtain the MTK;

wherein, the MTK mikey packet is the field of MTK msg defined in the ECM packet in Table 1, and the field of Number_of MTK_msg is the number of the MTK mikey packets, and generally, one ECM packet has two MTK mikey packets, each of which corresponds to one KI.

TABLE 1

| Syntax | The number of bits | Indicator bit |
|---|---|---|
| Table_id | 1 | Bslbf |
| Section_syntax_indicator | 1 | Bslbf |
| Reserved | 6 | Bslbf |
| Section_length | 12 | Bslbf |
| Reserved | 2 | Bslbf |
| Number_of_MTK_msg | 2 | Bslbf |
| For (i=0; i<Number_of_MTK_msg; i++) | | |
| { | | |
| Key_Indicator | KI Length | Uimsbf |
| Length | 8 | Uimsbf |
| MTK_msg | Length*8 | Bslbf |
| } | | |

Analyzing the MTK mikey packets can comprise the following steps:

S501, the Key_Indicator corresponding to the MTK mikey packets in the ECM packet is obtained as y, and y is compared with the locally stored key indicator local_ki, and if the local_ki is equal to y, it indicates that the MTK mikey packet has been processed and no more process is needed, and then the MTK mikey packet is ignored and the next MTK mikey packet is analyzed, and if the local_ki is not equal to y, proceed to step S502;

S502, the MTK mikey packet is started to be processed, and the MTK mikey packet is used to obtain the MTK;

S503, the MTK mikey packet is examined, and it is judged whether the MTK mikey packet is an error packet or not, and if the MTK mikey packet is an error packet, proceed to step S504, otherwise, proceed to step S507;

specifically, the format of the MTK mikey packet is examined, and the format of the MTK mikey packet is shown in Table 2, and it is examined whether the data section indicating the version information and the data type information of the MTK mikey packet is a predetermined value or not, and it is examined whether the data section that stores the key for descrambling the audio and video data is 0 or not.

For example, it is examined whether the first two bytes of the MTK mikey packet are 0x00 and 0x01 or not, and according to the mikey packet protocol, the first two bytes must be 0x00 and 0x01, and the last few bytes are used to store the encrypted data, and they are not 0 under normal circumstances, and there is not a fixed range for the last few bytes, which can be limited to 12 bytes or so. Therefore, only in the condition that the first two bytes of the MTK mikey packet are 0x00 and 0x01 respectively and the data section that stores the key for descrambling the audio and video data is not 0, it is considered to be a non-error packet, otherwise it is an error packet.

TABLE 2

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
! version    ! data type    ! next payload   !                 !
+-+-+-+-+-+-+-+-+-+-+-+-+-+-+-+-+-+-+-+-+-+-+-+-+ . . .         +
~                         Common Header . . .                  ~
!                                                              !
+-+-+-+-+-+-+-+-+-+-+-+-+-+-+-+-+-+-+-+-+-+-+-+-+-+-+-+-+-+-+-+-+
! next payload  !  Payload 1 . . .                             !
+-+-+-+-+-+-+-+-+                                              +
~                                                              ~
+-+-+-+-+-+-+-+-+-+-+-+-+-+-+-+-+-+-+-+-+-+-+-+-+-+-+-+-+-+-+-+-+
:                                :                             :
:                                :                             :
+-+-+-+-+-+-+-+-+-+-+-+-+-+-+-+-+-+-+-+-+-+-+-+-+-+-+-+-+-+-+-+-+
! next payload  !  Payload x . . .                             !
+-+-+-+-+-+-+-+-+                                              +
~                                                              ~
+-+-+-+-+-+-+-+-+-+-+-+-+-+-+-+-+-+-+-+-+-+-+-+-+-+-+-+-+-+-+-+-+
!                         MAC/Signature                        ~
+-+-+-+-+-+-+-+-+-+-+-+-+-+-+-+-+-+-+-+-+-+-+-+-+-+-+-+-+-+-+-+-+
```

S504, the MTK mikey packet is discarded, and it is judged whether the current MTK is valid or not, if yes, proceed to step S505, otherwise, proceed to step S506;

if the corresponding KI and MTK are found in the locally buffered record, it is considered that the current MTK is valid.

Generally, each MTK has one cycle and it automatically becomes invalid when the cycle expires, and the invalid MTK and KI are cleared or replaced with new MTK and KI.

If there is one MTK with effective cycle locally, before the MTK becomes invalid, attempts are made to re-receive the MTK mikey all the time, and if a normal MTK mikey has still not been received when the MTK becomes invalid, the user is prompted that data errors occur and the playing is stopped;

S505, the next ECM packet is received, and return to step S10.

S506, the playing is stopped, and the user is prompted that there are errors in the code stream information, and it ends.

S507, the MTK mikey packet is sent to the UAM or the SD card to obtain the MTK, and the corresponding relationship between the MTK and the KI is recorded, and the local_ki value is set as y.

After the terminal obtains the MTK, it uses the MTK to perform the descrambling operation.

Those skilled in the field can understand that all or part of the steps in the aforementioned method can be completed by instructing related hardware with the program, and said program can be stored in a computer readable storage medium, such as read-only memory, magnetic disk, or CD-ROM and so on. Optionally, all or part of the steps of the aforementioned embodiment can be implemented with one or more integrated circuits. Accordingly, each module/unit in the aforementioned embodiment can be implemented in the form of hardware or software functional modules. The present invention is not limited to any particular form of hardware and software combination.

Of course, the present invention also has a variety of other embodiments, and without departing from the spirit and essence of the present invention, those skilled in the field can make different kinds of corresponding changes and deformations according to the present invention, and all these changes and deformation should belong to the protection scope of the appended claims in the present invention.

INDUSTRIAL APPLICABILITY

The present invention improves the effeciency of the terminal processing the ECM packets and saves the limited resources of the terminal. Moreover, when an error pecket is received, the present invention does not stop playing immediately, but continues to receive and analyze the ECM packets in the condition that the current key for descrambling the audio and video data is valid, until the current key for descrambling the audio and video data becomes invalid. Therefore, the present invention improves the stability of playing programs and provides a better experience for users.

What is claimed is:

1. A method for processing entitlement control message (ECM) packets, the method comprising:
    receiving, by a terminal, a broadcast code stream multiplexing frame, and acquiring an ECM packet from the received broadcast code stream multiplexing frame; and
    in response to an indicator of the ECM packet is consistent with a locally stored ECM packet indicator, discarding the ECM packet;
    in response to the indicator of the ECM packet is inconsistent with the locally stored ECM packet indicator, updating the indicator of the local ECM packet and analyzing the ECM packet;
    wherein the step of analyzing the ECM packet comprises:
    obtaining data packets that encapsulated with a key for descrambling audio and video data (MTK mikey packets) from the ECM packet and analyze them one by one;
    in response to that a key indicator corresponding to a MTK mikey packet is consistent with a locally stored key indicator, ignoring the MTK mikey packet and analyzing the next MTK mikey packet;
    in response to that a key indicator corresponding to a MTK mikey packet is inconsistent with the locally stored key indicator, further judging whether the MTK mikey packet is an error packet,
    when the MTK mikey packet is not an error packet, obtaining the MTK using the MTK mikey packet;
    if the MTK mikey packet is an error packet, discarding the MTK mikey packet, and receiving and analyzing the next ECM packet while continue playing as long as the current MTK is valid; and when the current MTK become invalid, stop playing.

2. The method of claim 1, wherein the step of judging whether the MTK mikes packet is an error packet comprises:
    determining that the data packet is a non-error packet if data sections indicating version information and data type information of the data packet are examined to be both predetermined values and a data section storing the key for descrambling the audio and video data is examined to be not 0;
    determining that the data packet is an error packet if the data sections indicating the version information and data type information of the data packet are examined to be not predetermined values or the data section storing the key for descrambling the audio and video data is examined to be 0.

3. The method of claim 1, wherein, if the data packet is a non-error packet, the method further comprises:
    updating the locally stored key indicator to be the key indicator corresponding to the data packet.

4. An apparatus for processing Entitlement Control Message (ECM) packets, the apparatus comprising:
    a processor;
    and a storage device for storing computer executable instructions that when executed by the processor cause the processor to perform the step of:
    receiving, by a terminal, a broadcast code stream multiplexing frame, and acquiring an ECM packet from the received broadcast code stream multiplexing frame; and
    in response to an indicator of the ECM packet is consistent with a locally stored ECM packet indicator, discarding the ECM packet;
    in response to the indicator of the ECM packet is inconsistent with the locally stored ECM packet indicator, updating the indicator of the local ECM packet and analyzing the ECM packet;
    wherein the step of analyzing the ECM packet comprises:
    obtaining data packets that encapsulated with a key for descrambling audio and video data (MTK mikey packets) from the ECM packet and analyze them one by one;
    in response to that a key indicator corresponding to a MTK mikey packet is consistent with a locally stored key indicator, ignoring the MTK mikey packet and analyzing the next MTK mikey packet;
    in response to that a key indicator corresponding to a MTK mikey packet is inconsistent with the locally stored key indicator, further judging whether the MTK mikey packet is an error packet,
    when the MTK mikey packet is not an error packet, obtaining the MTK using the MTK mikey packet;
    if the MTK mikey packet is an error packet, discarding the MTK mikey packet, and receiving and analyzing the next ECM packet while continue playing as long as the current MTK is valid; and when the current MTK become invalid, stop playing.

5. The apparatus of claim 4, further includes computer executable instructions for determining whether or not the data packet is an error packet by:
    determining that the data packet is a non-error packet if data sections indicating version information and data type information of the data packet are examined to be both first predetermined values and a data section storing the key for descrambling the audio and video data is examined to be not a second predetermined value;
    determining that the data packet is an error packet if the data sections indicating the version information or data type information of the data packet are examined to be not the first predetermined values or the data section storing the key for descrambling the audio and video data is examined to be the second predetermined value.

6. The apparatus of claim 5, further includes computer executable instructions for updating the locally stored key indicator to be the key indicator corresponding to the data packet
    after determining that the key indicator corresponding to the data packet is inconsistent with the locally stored key indicator.

7. The apparatus of claim 4, further includes computer executable instructions for updating the locally stored key indicator to be the key indicator corresponding to the data packet
    after determining that the key indicator corresponding to the data packet is inconsistent with the locally stored key indicator.

* * * * *